March 11, 1958  J. E. JOHNSON  2,826,094
DAMPENING MEANS
Filed Jan. 4, 1954
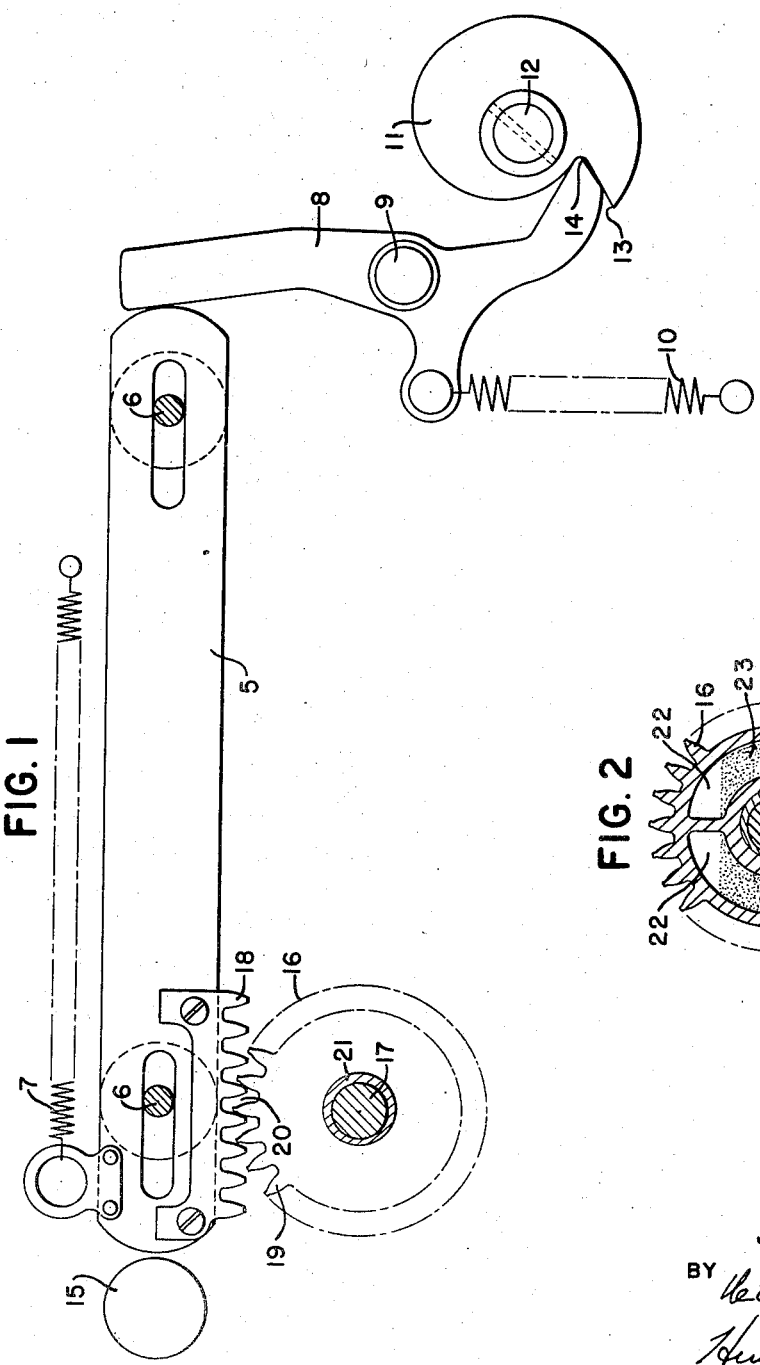
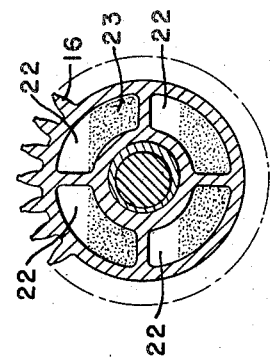
INVENTOR
JAMES E. JOHNSON
BY
HIS ATTORNEYS

United States Patent Office 2,826,094
Patented Mar. 11, 1958

2,826,094

DAMPENING MEANS

James E. Johnson, Dayton, Ohio, assignor to The National Cash Register Company, Dayton, Ohio, a corporation of Maryland Application January 4, 1954, Serial No. 401,822

5 Claims. (Cl. 74—572)

This invention relates to improvements in damping and homing means.

The principal object of the invention is to provide a means capable of two functions; namely, damping and homing movable parts.

A specific object is to provide a novel inertia damper and homing means.

Another specific object of the invention is to provide an inertia damper control of rebound and vibration in movable parts, said damper also capable of moving such parts to their home positions when they have a tendency to lag.

A specific embodiment of the invention comprises a loose running gear in mesh with teeth on the part, which teeth permit relative movement between the loose running gear and the part, so that the gear may either snub the rebound or vibrating movement of the part, or nudge the part in its movement to move it into its home position.

With these and incidental objects in view, the invention includes certain novel features of construction and combinations of parts, a preferred form or embodiment of which is hereinafter described with reference to the drawing which accompanies and forms a part of this specification.

Of said drawing,

Fig. 1 is a side elevation illustrating the loose running gear in mesh with a rectilinear movable slide.

Fig. 2 is a detail view of a modified loose running gear for use with an extraordinarily heavy slide.

General description

The invention provides a combination inertia damper for parts in machines, and a homing means in the event such parts lag in their setting movements.

All parts in high-velocity machines having intermittent motion must perform their work within a limited number of degrees of a machine cycle, and, therefore, they start and stop one or more times during the machine cycle. When a part in high velocity is stopped suddenly, it will rebound or vibrate in cycles of varied magnitude, due to the kinetic energy existent. When such rebound or vibration interferes with proper functioning of the part, some means must be employed to stop such rebound or vibration in order to overcome the faulty operation. The illustrated mechanism comprises a bar movable in a rectilinear motion, but the invention can also be applied to parts having rotary motion.

The damper illustrated herein comprises a rotatable gear whose teeth mesh with teeth on the movable part. The teeth on the damper are cut to provide a loose fit with the teeth on the movable part, so that an appreciable relative movement between the gear and the part is possible. To obtain sufficient relative movement between the damper and the part teeth, it was determined that satisfactory results are obtained by cutting the teeth of the damper and of the part .020 inch deeper than normal. A further variation in clearance may be obtained by mounting the damper gear on an eccentric bearing.

The relative weights of the parts are important, and experiment has shown that the dead weight range of the damper gear should fall between 60% and 70% of the dead weight of the movable part. Thus, for example, if the dead weight of the movable part is 131 grams, the dead weight of the damper gear should be about 86 grams, when based on 65%.

The novel inertia damper can be applied to a wide variety of uses. In particular, it will be helpful in controlling rebound and vibration in parts that must be stopped at a number of positions that are not in any regular sequence, such as a line-finding table in accounting machines, and when traveling in either direction.

The loose running gear will maintain a more uniform travel of a part that may be erratic in travel due to loads coming on at different times during the cycle of operation. If the part slows up, the gear will run ahead and, through the flywheel effect, assist the part over the load. Then, if the part speeds up when it is over the hump of the load, it will have to pick up the gear, which has a tendency to prevent acceleration.

The novel loose running gear can be used as a homing device for a machine, such as a cash register or an accounting machine. In such machines, the current for operating the motors of such machines is cut off just before the machines reach home position, and they sometimes stop short of home position, thus becoming inoperative for the next operation until they are moved to home position by a manual means. The lose running gear will act as a flywheel to assist the machine in moving home. In this application of the invention, the gear would have to be balanced against the resistance of the machine. Such balancing can be effected by means of a raceway cut into the side of the gear and partly filled with lead shot.

In this construction, the gear will overrun at impact, and then the shot will follow up, adding their slower action against the gear. As illustrated in Fig. 2, the gear is provided with four pockets and therefore provides four surfaces for the shot to pack against.

Detailed description

The illustrated embodiment of the invention includes a reciprocating bar 5, slotted to move on two studs 6. A spring 7, connected to the bar 5, holds the bar 5 in contact with a cam follower 8, pivoted on a stud 9, carried by the machine frame. A spring 10, stronger than the spring 7, maintains the lower end of the cam follower against a cam 11, on a drive shaft 12, the latter rotatable in the direction of the arrow.

The bar 5 is moved toward the right (Fig. 1) by the spring 7 when the cam 11 rotates the follower arm 8 clockwise (Fig. 1), and, when the high part 13 of the cam 11 passes the end 14 of the follower arm 8, the spring 10 impels the follower arm 8 and the bar 5 leftwardly until arrested by a stop 15. The impact of the bar 5 against the stop 15 causes a rebound or vibrating movement of the bar 5.

To stop the bar 5 when it strikes the stop 15, a gear 16 is rotatably mounted on a stud 17, which meshes with teeth 18 on the bar 5. The teeth 18 on the bar and the teeth 19 of the gear 16 are cut deeper than standard teeth to provide clearance 20 between them to allow relative movement between the gear and bar. The gear may also be mounted on an eccentric 21 on the stud 17 to provide for further adjustment between the teeth of the gear and the bar, so that a greater or lesser clearance 20, to obtain a fine adjustment when needed, by raising or lowering the gear 16, is provided.

When the bar 5 is impelled toward the stop 15, the gear 16 is rotated therewith and acts as a flywheel. At this time, the left sides of the teeth 18 engage the right sides of the teeth 19. When the bar 5 is arrested by contact with the stop 15, the gear continues to rotate an extent permitted by the clearance 20, and the momentum of the gear 16 causes the teeth 19 to strike the right side of the teeth 18 with sufficient force to prevent rebound or vibration movement of the bar 5.

It was determined that the dead weight of the gear should be about 65% of the dead weight of the bar 5 to effectively arrest the bar 5. It was also determined that sufficient clearance 20 is provided by cutting the teeth 18 and 19 approximately .020 inch deeper than standard gear teeth. As pointed out above, more or less clearance 20 can be provided by mounting the gear 16 eccentrically on the stud 17.

The gear 16 also acts as a homing means in the event the bar 5 does not move all the way home. If for some unexpected reason the bar 5 does not move all the way home or tends to slow down, the gear 16, acting as a flywheel, impels the teeth 19 thereof against the right sides of the teeth 18 and drives the bar against the stud 15.

Thus the novel loosely mounted gear provides a combination damper and homing device, which acts automatically according to the operating conditions of the mechanism.

Ordinarily, a simple gear 16 is sufficient to obtain the desired results. However, under some conditions, the weight of the gear may not be sufficient to control the mechanism properly. Such a condition may exist if the gear is used as a motion equalizer and homing aid for a machine such as an adding machine, a cash register, or an accounting machine. In such machines, the load on the driving means varies at different points during a machine cycle. In such an application, the gear 16 meshes with a companion member on the main drive shaft, and then, if the shaft slows up due to a heavy load at certain points in the machine cycle, the gear 16 runs ahead and, through the flywheel effect, assists the machine over the load. Then, if the machine speeds up when it passes the hump of the load, the machine will have to pick up the gear 16, which has a tendency to prevent excessive acceleration.

In many electrically-operated cash registers and accounting machines, the current through the motor is cut off before the machine reaches its home position, and the momentum of the machine parts is depended upon to carry the machine home. If, as sometimes occurs, the machine does not coast all the way home, it cannot be released for a succeeding operation until it is brought home by a manual means. The loose running gear, having a flywheel effect, will assist the machine in moving all the way home. In such applications, the loose gear 16 must be better balanced and weighted to become effective for such purpose. In such a use, the gear 16 (Fig. 2) is provided with one or more raceways 22, cut into the side of the gear. The raceways are partly filled with powdered metal, or lead shot, 23. Number 12 shot has been found to be very effective. When the raceways are partly filled in this way, and the gear overruns the part to which it is geared, the shot will follow at a slower rate. When the gear is stopped, the shot 23 impact against the walls of the raceways to further dampen the action of the machine, and, if the machine stops prematurely, the shot, impacting against the walls of the raceway, move the gear ahead to overcome the stalling of the machine.

The shot 23 are held in the raceways by a close fitting plate secured to the side of the gear.

The loose running gear 16 is also useful in controlling the operation of differentially-movable devices, such as differential actuators in adding machines, cash registers, and accounting machines, where the rack may be arrested in different positions under control of value manipulative devices, and the stopping position varies with each operation. Thus, when one digit is entered in a totalizer, the rack moves a lesser extent than when nine digits are entered. The loose running gear dampens the action of the actuator automatically, no matter in which position it is arrested.

The inertia damper is also useful in line-finding mechanisms in the class of machines referred to above. The line-finding mechanisms of such machines must stop at one of a number of positions that are not in regular sequence; for instance, a line-finding table of an accounting machine may stop at line 38 in one operation, line 3 in the next, and line 19 in another. In any event, the loose running gear is effective in any line position.

As illustrated, the loose gear 16 is shown in mesh with the bar 5, which moves in a straight, or rectilinear, line. The gear 16 is equally effective when applied to parts having rotary motion.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a mechanism of the class described, the combination of a movable member; means to reciprocate the member; a stop to arrest the member in a predetermined position; teeth on said movable member; a loosely rotatable gear having teeth engageable by the teeth on the movable member, said teeth spaced to provide for relative movement between them, said movable member rotating the gear through said teeth until the member is arrested, and the teeth on the gear acting to prevent rebound of the member after the member has been arrested by said stop; and an eccentric mounting for said gear to provide for adjusting the gear in relation to the movable member to increase or decrease the spacing between the said teeth.

2. In a mechanism of the class described, the combination of a movable member; means to reciprocate the member; a stop to arrest the member in a predetermined position; teeth on said movable member; a loosely rotatable gear having teeth engageable by the teeth on the movable member, said teeth spaced to provide for relative movement between them, said movable member rotating the gear through said teeth until the member is arrested, said gear continuing movement to the extent of said space between the teeth to engage and arrest rebound movement of the member after the member has been arrested by said stop; and an eccentric mounting for said gear to provide for adjusting the gear in relation to the movable member to increase or decrease the spacing between the said teeth.

3. In a mechanism of the class described, the combination of a movable member; means to reciprocate the member; a stop to arrest the member in a predetermined position; teeth on said movable member; a loosely rotatable gear having teeth engageable by the teeth on the movable member, said teeth spaced to provide for relative movement between them, said movable member rotating the gear through said teeth until the member is arrested, and the teeth on the gear acting to prevent rebound of the member after the member has been arrested by said stop, said gear teeth acting to accelerate the movement of the member when the member is slowed in movement below the speed of the gear before being arrested by the stop; and an eccentric mounting for said gear to provide for adjusting the gear in relation to the movable member to increase or decrease the spacing between the said teeth.

4. In a mechanism of the class described, the combination of a movable member; a stop to arrest the member in a predetermined position; teeth on said movable member; a loosely mounted rotatable gear driven by said teeth, the teeth on the member and on the gear being spaced to provide relative movement therebetween to permit the gear to move after the movable member is arrested by the stop to snub rebound movement of the member, and to urge the member toward the stop if the member slows down to a speed slower than the speed of the gear; and an eccentric mounting for said gear to provide for adjusting the gear in relation to the movable member to increase or decrease the spacing between the said teeth.

5. In a machine of the class described, a driven member; means to drive the driven member; gear teeth on the driven member; a loosely rotatable gear having teeth in mesh with the gear teeth on the driven member, said gear acting as a flywheel to drive the driven member when the driven member slows down to a speed less than the speed of the gear, said teeth formed to provide space therebetween to permit relative movement between the driven member and the gear; and an eccentric mounting for said gear to provide for adjusting the gear in relation to the movable member to increase or decrease the spacing between the said teeth.

References Cited in the file of this patent

UNITED STATES PATENTS

| | | |
|---|---|---|
| 717,372 | Fawkes | Dec. 30, 1902 |
| 1,190,198 | Sjostrom | July 4, 1916 |
| 2,002,561 | Wike | May 28, 1935 |
| 2,236,756 | Kunkel | Apr. 1, 1941 |
| 2,540,854 | Woestemeyer | Feb. 6, 1951 |
| 2,563,402 | Emery et al. | Aug. 7, 1951 |